United States Patent
Margetts et al.

(10) Patent No.: US 10,120,817 B2
(45) Date of Patent: Nov. 6, 2018

(54) DEVICE AND METHOD FOR SCHEDULING COMMANDS IN A SOLID STATE DRIVE TO REDUCE PEAK POWER CONSUMPTION LEVELS

(71) Applicant: Toshiba Memory Corporation, Minato-ku, Tokyo (JP)

(72) Inventors: Julien Margetts, Thame (GB); Gary James Calder, Eastleigh (GB)

(73) Assignee: Toshiba Memory Corporation, Tokyo (JP)

( * ) Notice: Subject to any disclaimer, the term of this patent is extended or adjusted under 35 U.S.C. 154(b) by 266 days.

(21) Appl. No.: 14/871,124

(22) Filed: Sep. 30, 2015

(65) Prior Publication Data

US 2017/0090802 A1 Mar. 30, 2017

(51) Int. Cl.
*G06F 13/16* (2006.01)
*G06F 1/32* (2006.01)
*G06F 12/02* (2006.01)
*G06F 3/06* (2006.01)

(52) U.S. Cl.
CPC ........ *G06F 13/1689* (2013.01); *G06F 1/3275* (2013.01); *G06F 3/0625* (2013.01); *G06F 3/0659* (2013.01); *G06F 3/0679* (2013.01); *G06F 12/0246* (2013.01)

(58) Field of Classification Search
CPC .. G06F 13/4234; G06F 3/0659; G06F 3/0625; G06F 3/0679; G06F 12/0246; G06F 1/3275

See application file for complete search history.

(56) References Cited

U.S. PATENT DOCUMENTS

| | | | |
|---|---|---|---|
| 8,745,369 B2 | 6/2014 | Yurzola et al. | |
| 9,064,059 B2 | 6/2015 | Kim | |
| 9,093,160 B1* | 7/2015 | Ellis | G11C 16/10 |
| 2007/0279988 A1* | 12/2007 | Nguyen | G11C 16/0483 |
| | | | 365/185.18 |
| 2008/0059822 A1* | 3/2008 | Choi | G06F 1/3203 |
| | | | 713/320 |
| 2011/0173462 A1* | 7/2011 | Wakrat | G06F 1/26 |
| | | | 713/300 |
| 2012/0023356 A1* | 1/2012 | Byom | G11C 5/14 |
| | | | 713/340 |
| 2014/0047200 A1* | 2/2014 | Isachar | G06F 1/3225 |
| | | | 711/154 |

(Continued)

*Primary Examiner* — Arpan P. Savla
(74) *Attorney, Agent, or Firm* — White & Case LLP

(57) ABSTRACT

The current consumed by flash memory devices on the channels of a solid-state drive (SSD) device will be in the form of a time varying waveform, characterized mainly by the types of commands being processed, and are often in the form of periods of constant levels interspersed with very short high current peaks or spikes. When multiple commands are being processed, significant high current peak demands and current surges can occur. The invention described herein is a device and method for scheduling commands to be processed in order to reduce the size of peak current demands and current surges. According to one embodiment of the invention, the device and method for scheduling a command uses look-up tables to determine the time to initiate the processing of the command by the flash memory devices.

21 Claims, 18 Drawing Sheets

(56) References Cited

U.S. PATENT DOCUMENTS

| | | | |
|---|---|---|---|
| 2014/0219003 A1* | 8/2014 | Ebsen | G11C 13/0004 365/148 |
| 2015/0098272 A1* | 4/2015 | Kasorla | G11C 16/10 365/185.11 |
| 2015/0199999 A1* | 7/2015 | Sommer | G11C 5/14 365/226 |
| 2015/0261473 A1* | 9/2015 | Matsuyama | G06F 3/0625 711/103 |
| 2016/0077961 A1* | 3/2016 | Erez | G06F 3/0625 711/103 |
| 2016/0116968 A1* | 4/2016 | Thangaraj | G06F 3/0659 713/320 |
| 2017/0060461 A1* | 3/2017 | Erez | G06F 3/0625 |

\* cited by examiner

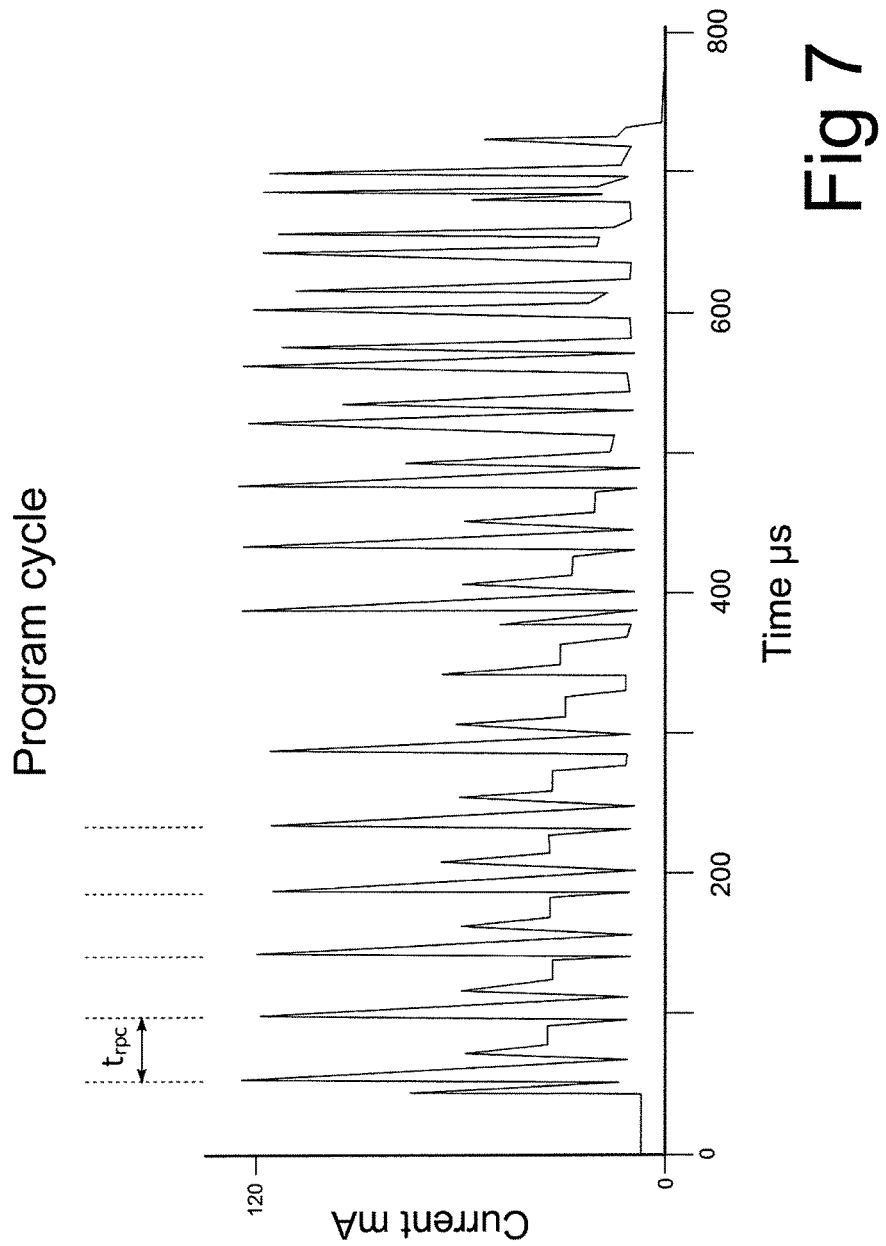

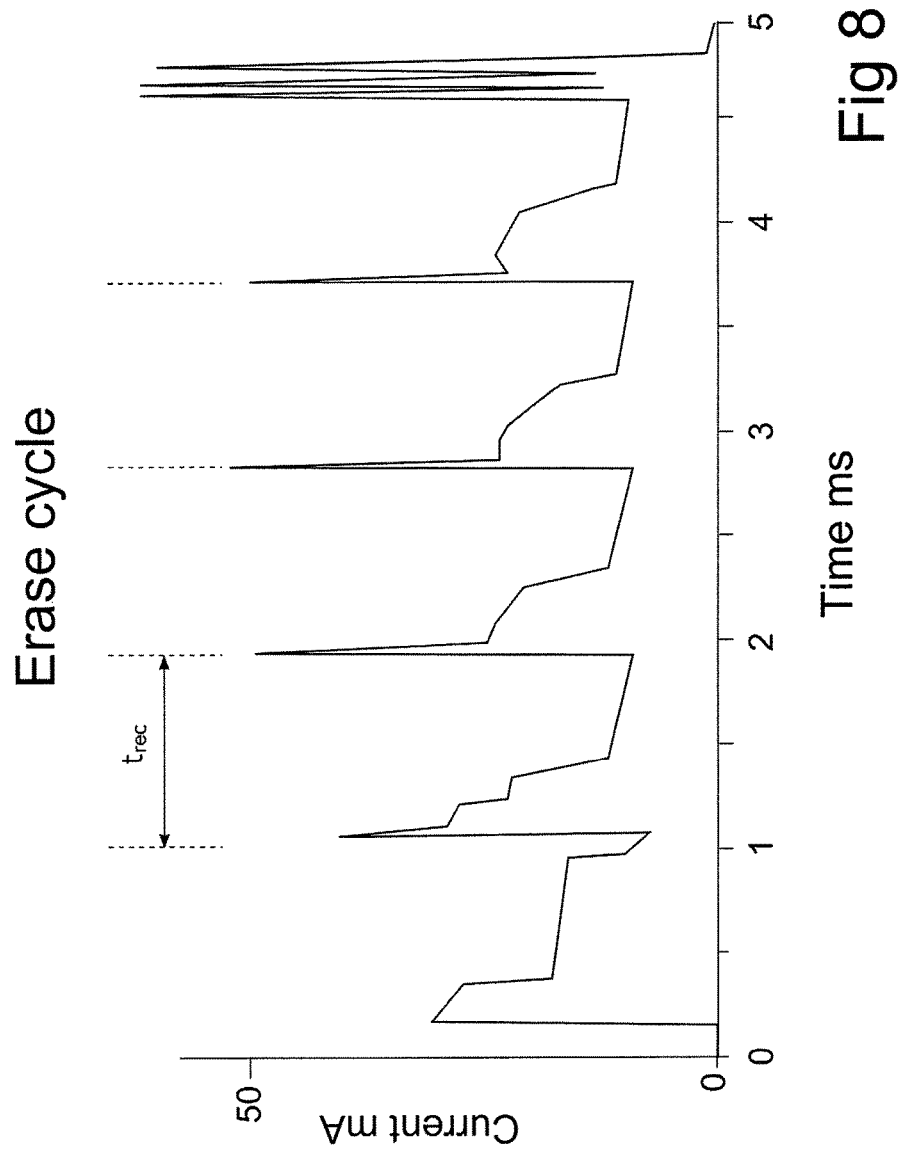

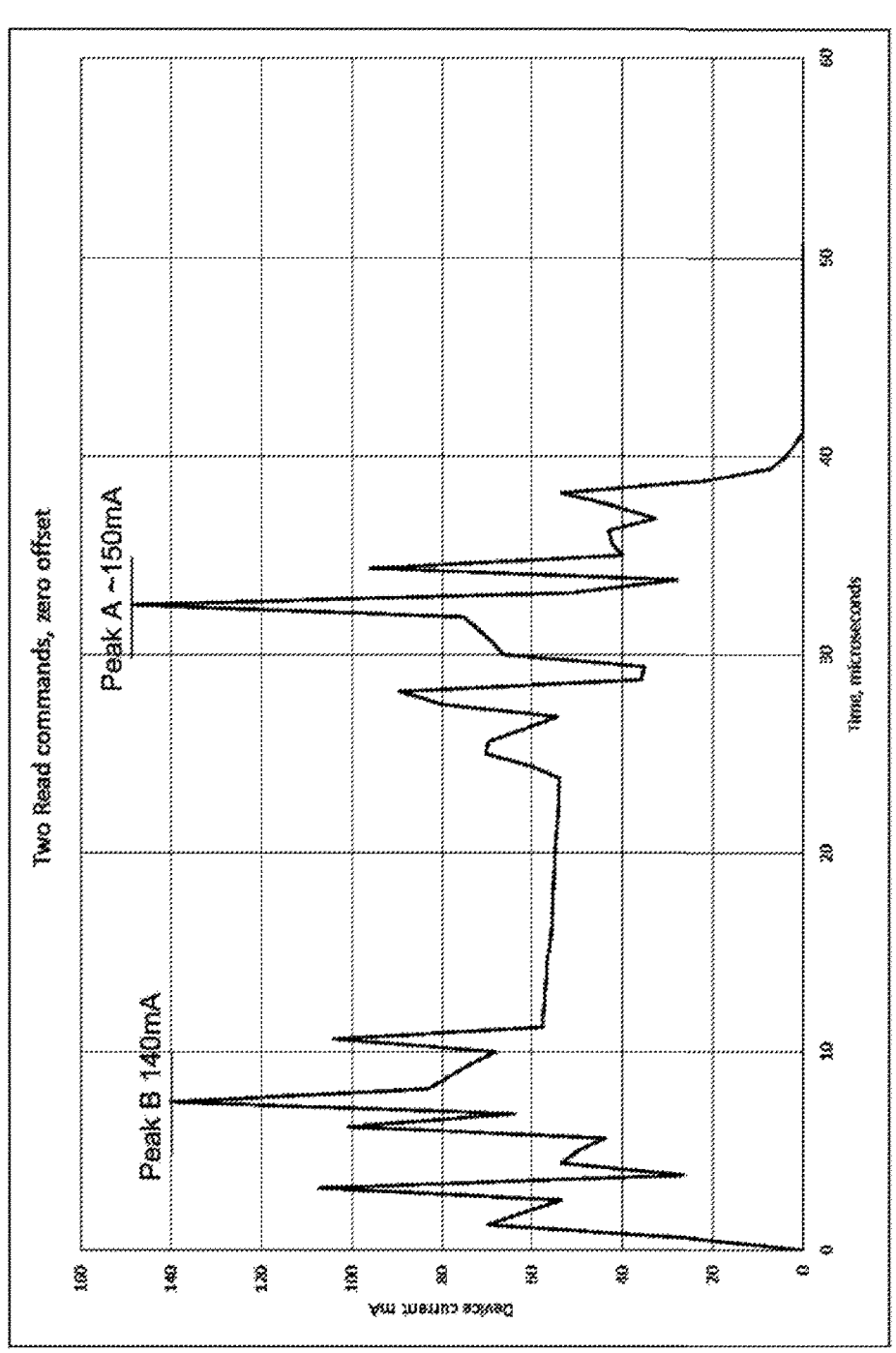

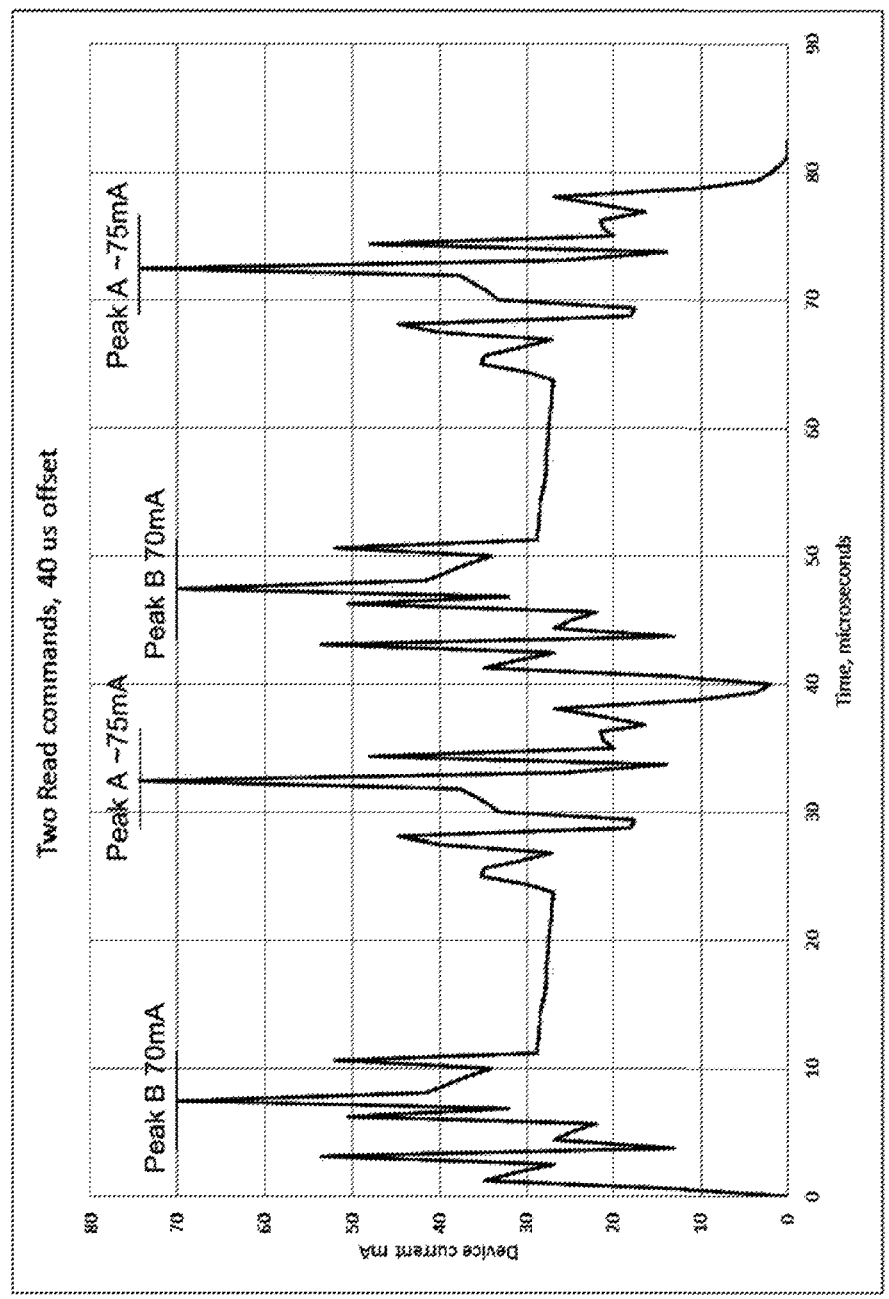

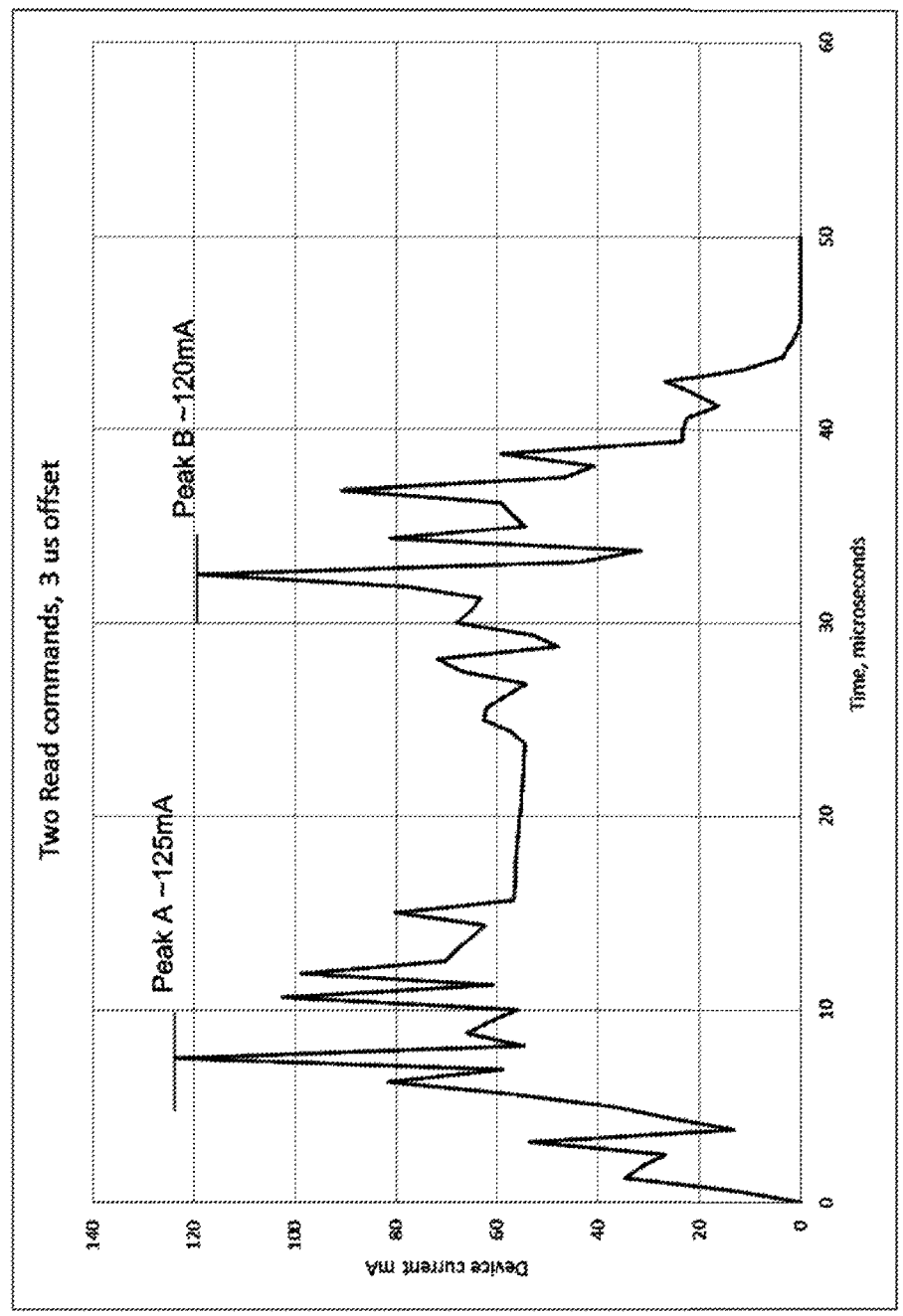

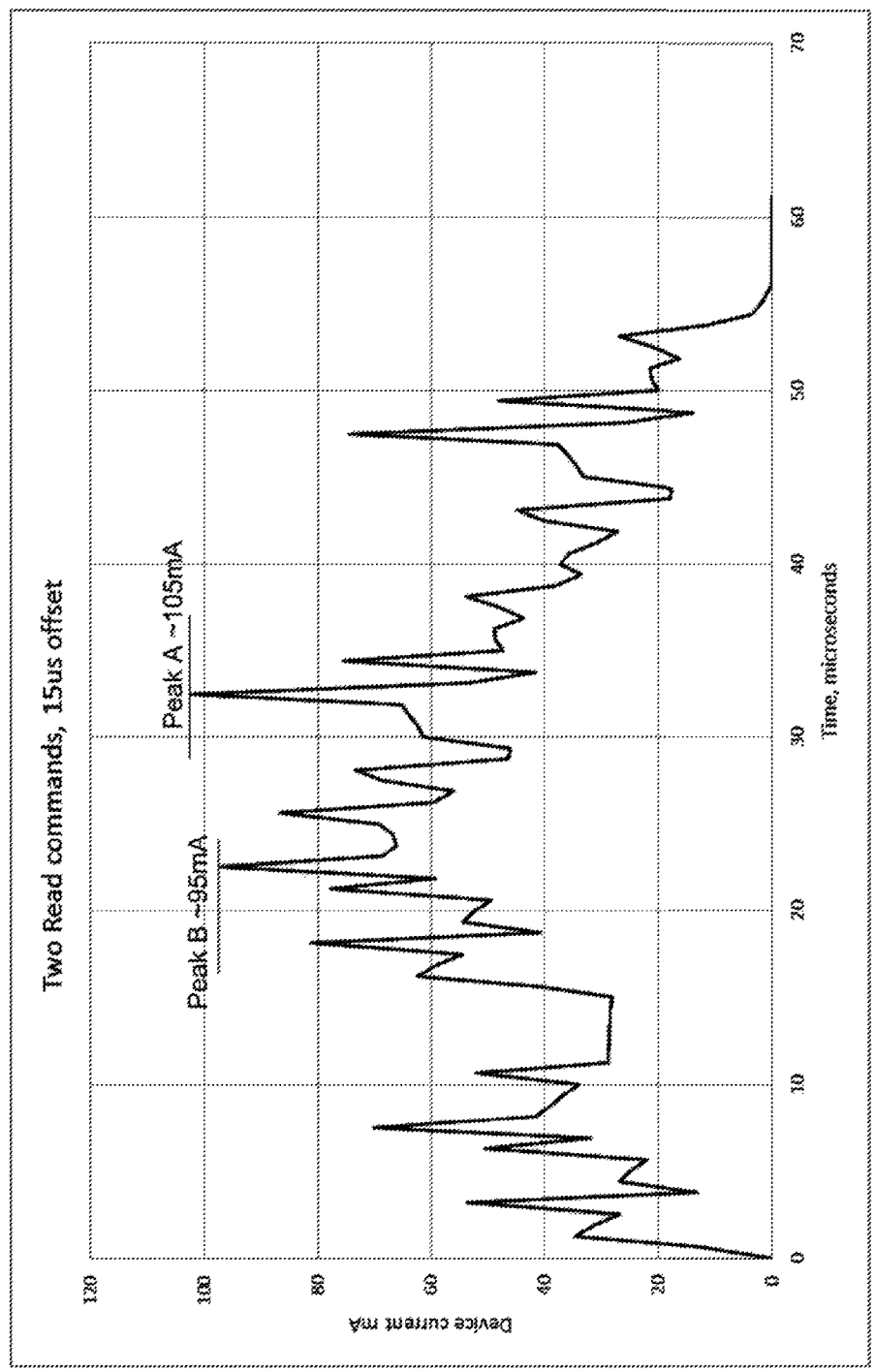

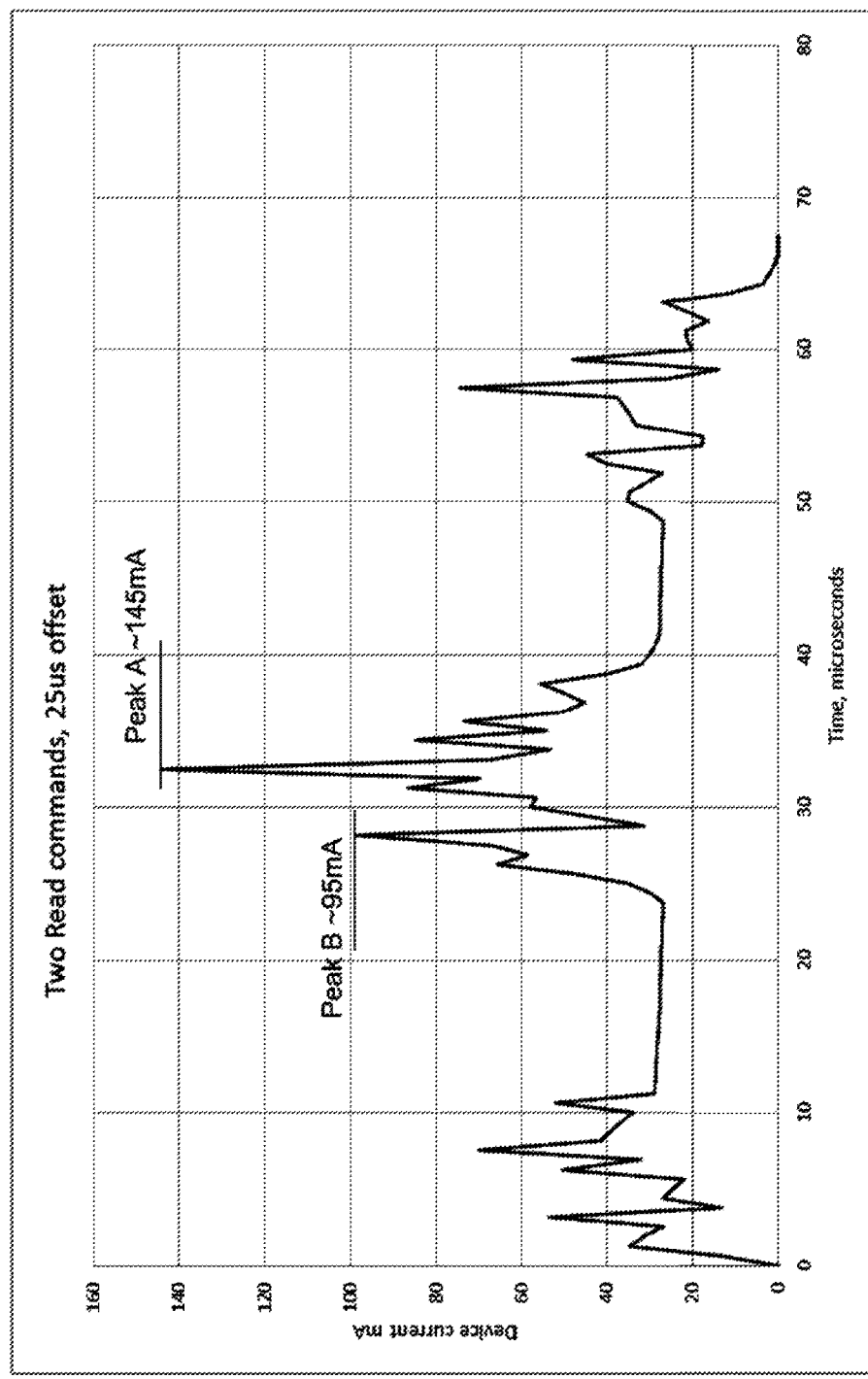

Look-Up Table

| Region | treg$_{start}$ | treg$_{end}$ | (A)bove or (B)elow (L)evel ? | (S)afe/(U)nsafe to start second read command? |
|---|---|---|---|---|
| 1 | 0 or t$_0$ | t1 | A | U |
| 2 | t1 | t2 | B | S |
| 3 | t2 | t3 | A' | U |
| 4 | t3 | t4 | B' | S |
| 5 | t4 | t5 | A'' | U |
| 6 | t5 | t6 | B'' | S |
| 7 | t6 | t'$_{end}$ | B''' | S |

Fig 11

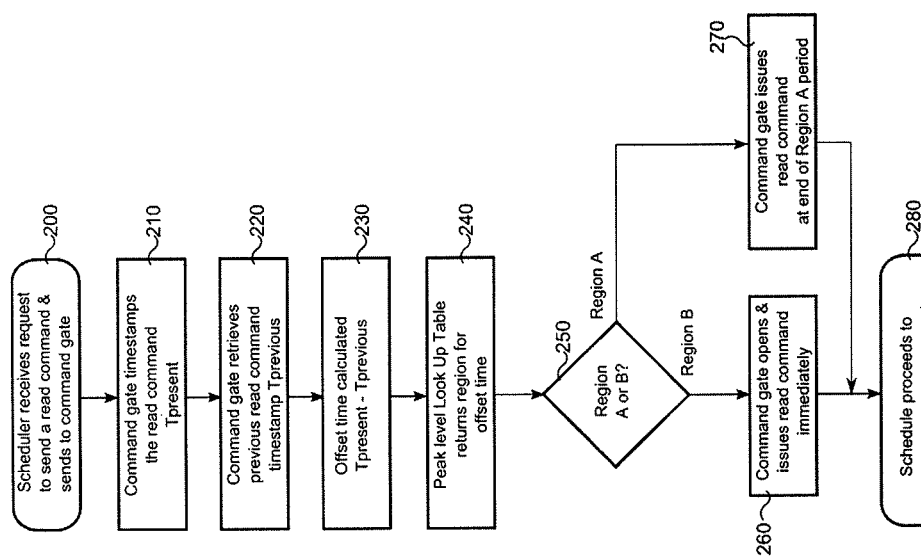

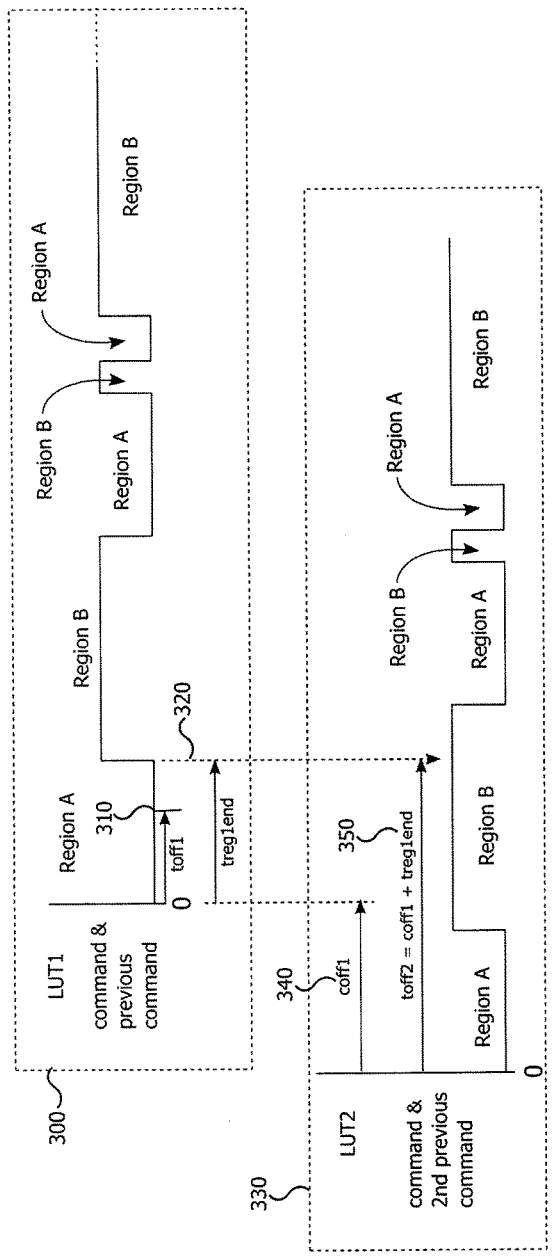

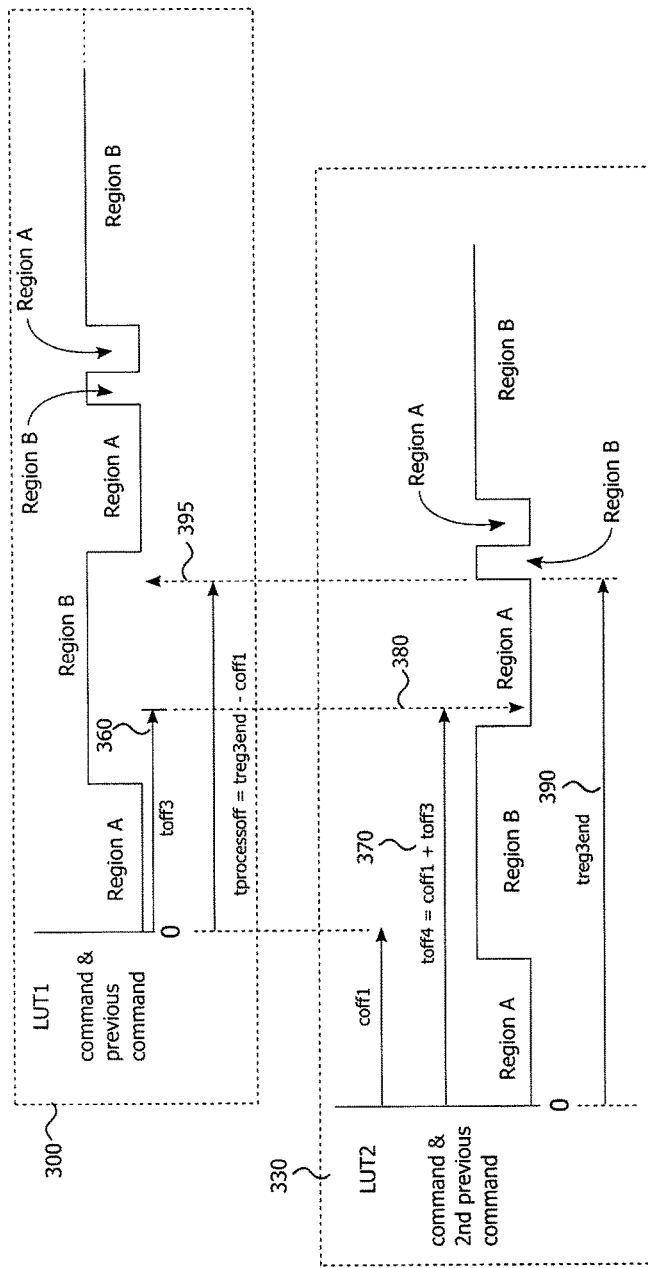

DEVICE AND METHOD FOR SCHEDULING COMMANDS IN A SOLID STATE DRIVE TO REDUCE PEAK POWER CONSUMPTION LEVELS

FIELD OF THE INVENTION

The invention generally relates to a device and method for scheduling commands to flash memory devices in a solid-state drive (SSD) to reduce the size of peak current demands and current surges.

BACKGROUND OF THE INVENTION

A solid-state drive (SSD) is a storage device which typically includes a memory controller attached to non-volatile solid-state memory, typically NAND flash memory, and may communicate with a host to store data received from the host or to retrieve stored data requested by the host. Typically, an SSD controller is linked to an array of NAND flash memory devices arranged as a number of devices on a number of channels, where a number of operations may be conducted in parallel or simultaneously across the number of devices on a number of the channels (memory buses).

During normal operation, the current consumption of an SSD is dependent on many factors, for example, the number and type of operations performed on the SSD.

In normal operation, the SSD controller sends commands (e.g., to perform read data, program data, and erase data operations) on the channels to the NAND flash memory devices. Depending on the commands sent by the SSD controller, the current consumed by the flash memory devices on the channels in question will be in the form of a time-varying waveform, characterized mainly by the type of command. These time-varying waveform characteristics are often in the form of periods of relatively constant low-levels interspersed with very short high current spikes or current peaks. The current spikes are often repeated and cyclical in nature. The frequency, timing, duration, and levels of both the current spikes and the constant low-level current periods on the flash memory devices of the SSD are also dependent on the commands being performed by the SSD, with each command producing a characteristic profile of current spikes and low-level periods.

Further, when an SSD device uses more than one channel, multiple current spikes can occur simultaneously over multiple memory devices on multiple channels, which causes higher current demands and current surges. Higher current demands and current surges are also possible on a single channel where multiple commands are running on multiple memory devices on the single channel at a given time.

One method used to address the variations in current consumption caused by current surges in an SSD is to use bulk capacitors, or other similar energy storage devices, to store the additional energy required to meet the demands of current surges. However, the cumulative effect of simultaneous current surges across multiple channels of an SSD device may increase peak current demand beyond the energy levels that bulk capacitors can provide. Therefore, larger or more capable power supplies may be required for the SSD. In addition, increased peak-power consumption and the cumulative effect of multiple peak-power demands can result in signal integrity problems between the NAND flash memory devices and the SSD controller due to attendant shifts in supply voltages and "ground bounce" (displacement of the zero-voltage (V) reference). Ground bounce is a consequence of the small, but finite, inductances present in voltage supply and ground tracks on the printed circuit board from the voltage regulators to the NAND flash memory devices themselves. Decoupling capacitors placed close to the NAND flash memory devices can be used to ameliorate this unwanted effect, but unfortunately do not eliminate it.

Accordingly, it is advantageous to minimize the influence of current spikes in SSD storage devices in order to reduce peak-power demands and current surges, thereby reducing both (1) the need for large bulk and decoupling capacitors, and (2) the decrease in signal integrity caused by simultaneous current peaks and current surges.

One solution to solve signal integrity problems in SSD storage devices, as taught in U.S. Pat. No. 9,064,059 ("Kim"), has been to apply an offset or delay to the timing of bus transitions, i.e., the data signals on the channels with respect to a common clock in order to eliminate the effect of simultaneous control signals arriving at multiple channels. The logic behind this solution is that a timing delay introduced to one or more channels will result in a reduced likelihood of simultaneous current spikes generated the SSD controller.

However, the solution taught by Kim only addresses the period of switching of the bus signals on the channel between the SSD controller and the flash memory devices, which is the period when a command is sent from the controller to the flash memory device. Once a command is received by the memory device, the bus goes into a quiescent state and the flash memory device internally processes the command. It is during this period of command processing, independent of any further bus activity and where the SSD controller may be free to address another command to another memory device on the same bus, that the flash memory device consumes current with a time varying waveform of sustained current levels and short, sharp, repetitive peaks. Therefore, the solution taught by Kim is incomplete.

Another problem with the above solution taught by Kim is the length of the timing delay itself especially if the delay is based on a high frequency common clock. As shown in FIG. 2, one possible implementation is where the time delays are based on a common clock and a time delay for each channel, dtN, is determined by a time period, dt, multiplied by the channel number, N. The time period, dt, being a fraction of the cycle time of the common clock. As the common clock in FIG. 2 is a 200 MHz clock, For a typical clock frequency in a SSD controller in the 100 s of MHz, the resulting time delays are only a few nanoseconds (ns) in duration, making the solution too short and of no significant difference to the correlation of the current spikes and sustained current levels between multiple commands being processed which occur over much longer time scales, being tens of microseconds ($\mu$s) or even milliseconds (ms), depending on the particular flash memory characteristics and the type of commands issued.

Another solution to resolving high power consumption of SSD devices has been restrict the number of channels that can be simultaneously performing commands that have high power demands associated with them, as taught in U.S. Pat. No. 8,745,369 ("Yurzola"). However, Yurzola effectively limits, or chokes, the number of simultaneous commands of the same type in use without specially addressing the problem at hand, i.e., the coincidence or overlap of concurrent high current peaks or current spikes across multiple memory devices resulting in excessive peak-power demands being made by the SSD.

BRIEF DESCRIPTION OF THE INVENTION

One embodiment of the invention described herein performs the scheduling of the command by analyzing the current consumption profile of the command to be performed and the current consumption profile of at least one command being currently processed in the SSD. In one embodiment, the command to be processed is scheduled at a time that reduces the size of current spikes and current surges occurring in the SSD.

A further embodiment schedules the command to be processed by using look-up tables to determine the time to initiate, or start, processing the command in the SSD. In an embodiment the look-up table is created from the analysis of the current consumption profile of the command to be processed and the current consumption profile of at least one command that is being currently processed by the SSD.

In another embodiment, the scheduling of the command request is determined by selecting at least one look-up table from a plurality of look-up tables; the plurality of look-up tables is created by the analysis of the current profile of all commands against the current profile of each and every possible command that could be in process in the SSD. The selection of the at least one look-up table from the plurality of look-up tables is determined by the command to be processed and at least one command that is currently being processed by the SSD.

In one embodiment, the current profile of a command is the current timeline, i.e., the variation of current consumed by the SSD over time that results from executing of the command.

In a further embodiment of the invention, the look-up tables are created by determining the maximum current consumption that could result from a first and second command being processed sequentially during the time period of $t_0$ to $t_n$, where the first command is initiated at time $t_0$ and completes all current consumption at time $t_n$, and the second command that is initiated at time $t'_0$ (where $t_0 < t'_0 < t_n$) and completes its current consumption at time $t'_n$. The analysis used in this embodiment determines the maximum possible current consumption that could occur in the SSD between time $t_0$ and time $t'_n$ when the first command is initiated at a fixed time $t_0$ and the start time $t'_0$ for the second command.

In another embodiment, a controller unit is connected to a processor that is configured to allow communications, and receive instructions, via an I/O interface to a host computer system, wherein the controller unit is further connected to at least one memory bus channel which is connected to at least one flash memory device. The controller unit is configured to initiate a processing of a command issued by the processor to the flash memory device in response to the processor receiving an instruction from the host device. The controller unit is further configured to assign timestamps to the commands issued by the processor. The controller unit is connected to non-transitory storage memory that stores look-up tables having one or more rows containing time regions, each time region have a type identifier and a start time and an end time. The controller unit is further configured to evaluate the time difference between the timestamp of the command to be initiated and processed and the timestamp of a command previously initiated and being processed and to retrieve the row of a look-up table indexed by the time difference. If the time difference is determined to be within any time region of the look-up table having a type identifier of a first type, immediately initiating the processing of the command. Otherwise, if the time difference is found within any time region of the look-up table having a type identifier of a second type, initiating processing of the command at an end time of the time region with the second type identifier.

Further, in yet another embodiment, the storage memory can store a plurality of look up tables and the controller unit can be configured to select a look-up table from the plurality of look-up tables, based upon the type of command to be processed and the type of command previously processed, or a maximum allowed peak current value. The controller unit can be configured to index at least two look-up tables using the evaluated time difference. The controller unit can be further configured to use the time the first look-up table permits initiation of the processing of the command as the time to be used to index a second look-up table.

A further embodiment of this invention may have look-up tables constructed such that the type identifier of the time regions are of a first type if the peak current consumed by the flash memory devices by processing the command and the previous command will be below a maximum allowed peak current value, and of a second type if the peak current consumed by the flash memory devices by processing the command and the previous command will be above a maximum allowed peak current value.

A further embodiment of this invention may have the look-up tables updated in real-time with adjustment values based on real-time measurements of the ambient temperature, the age of the flash memory devices, the current consumed by a flash memory device according to the type of command issued to the flash memory device or the number of program and erase cycles performed by the flash memory devices.

BRIEF DESCRIPTION OF THE FIGURES

FIG. 7 is a graph illustrating the current consumption profile of a single program cycle on a NAND flash memory device of an SSD, in accordance with one embodiment of the invention.

FIG. 8 is a graph illustrating the current consumption profile of a single erase cycle on a NAND flash memory device of an SSD, in accordance with one embodiment of the invention.

FIG. 9a is a graph illustrating the combined current consumption profile of two read commands issued to NAND flash memory devices in an SSD with no offset time between the commands, in accordance with one embodiment of the invention.

FIG. 9b is a graph illustrating the combined current consumption profile of two read commands issued to NAND flash memory devices in an SSD with a 40 µs offset time between the commands, in accordance with another embodiment of the invention.

FIG. 9c is a graph illustrating the combined current consumption profile of two read commands issued to NAND flash memory devices in an SSD with a 3 µs offset time between the commands, in accordance with another embodiment of the invention.

FIG. 9d is a graph illustrating the combined current consumption profile of two read commands issued to NAND flash memory devices in an SSD with a 15 µs offset time between the commands, in accordance with another embodiment of the invention.

FIG. 9e is a graph illustrating the combined current consumption profile of two read commands issued to NAND flash memory devices in an SSD with a 25 µs offset time between the commands, in accordance with another embodiment of the invention.

FIG. 11 is a look-up table generated from a graph of the peak current values associated with two read commands issued to NAND flash memory devices in an SSD having a specific maximum peak current level, in accordance with one embodiment of the invention.

FIG. 12 is a flowchart of method steps for scheduling a command to be issued to a NAND flash memory device, in accordance with one embodiment of the invention.

FIG. 13 is a diagram illustrating the indexing of two look up tables when scheduling a command, in accordance with one embodiment of the invention.

FIG. 14 is a diagram illustrating the indexing of two look up tables when scheduling a command, in accordance with another embodiment of the invention.

DETAILED DESCRIPTION OF THE INVENTION

Figure 1:
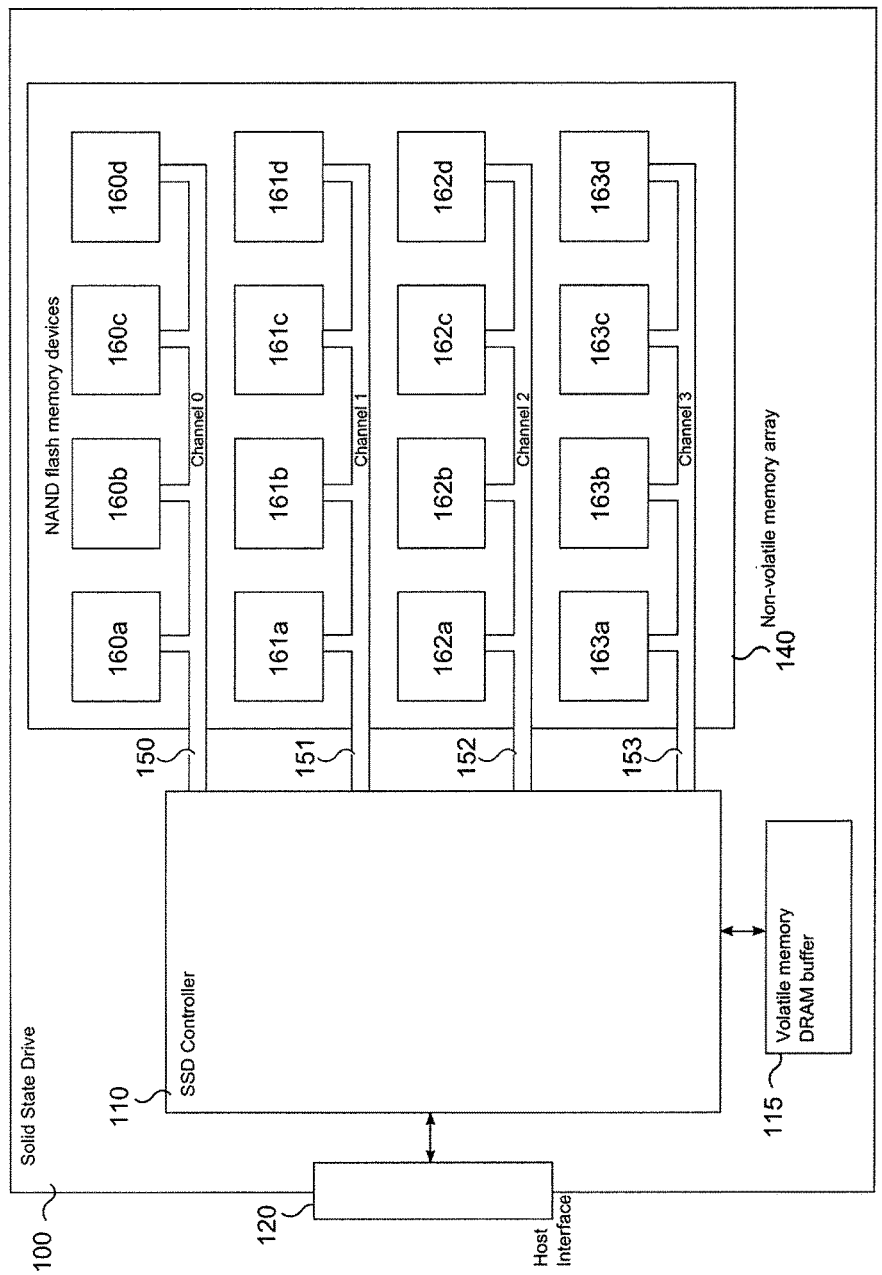
FIG. 1 is a block diagram illustrating a prior art SSD system.
Figure 3:
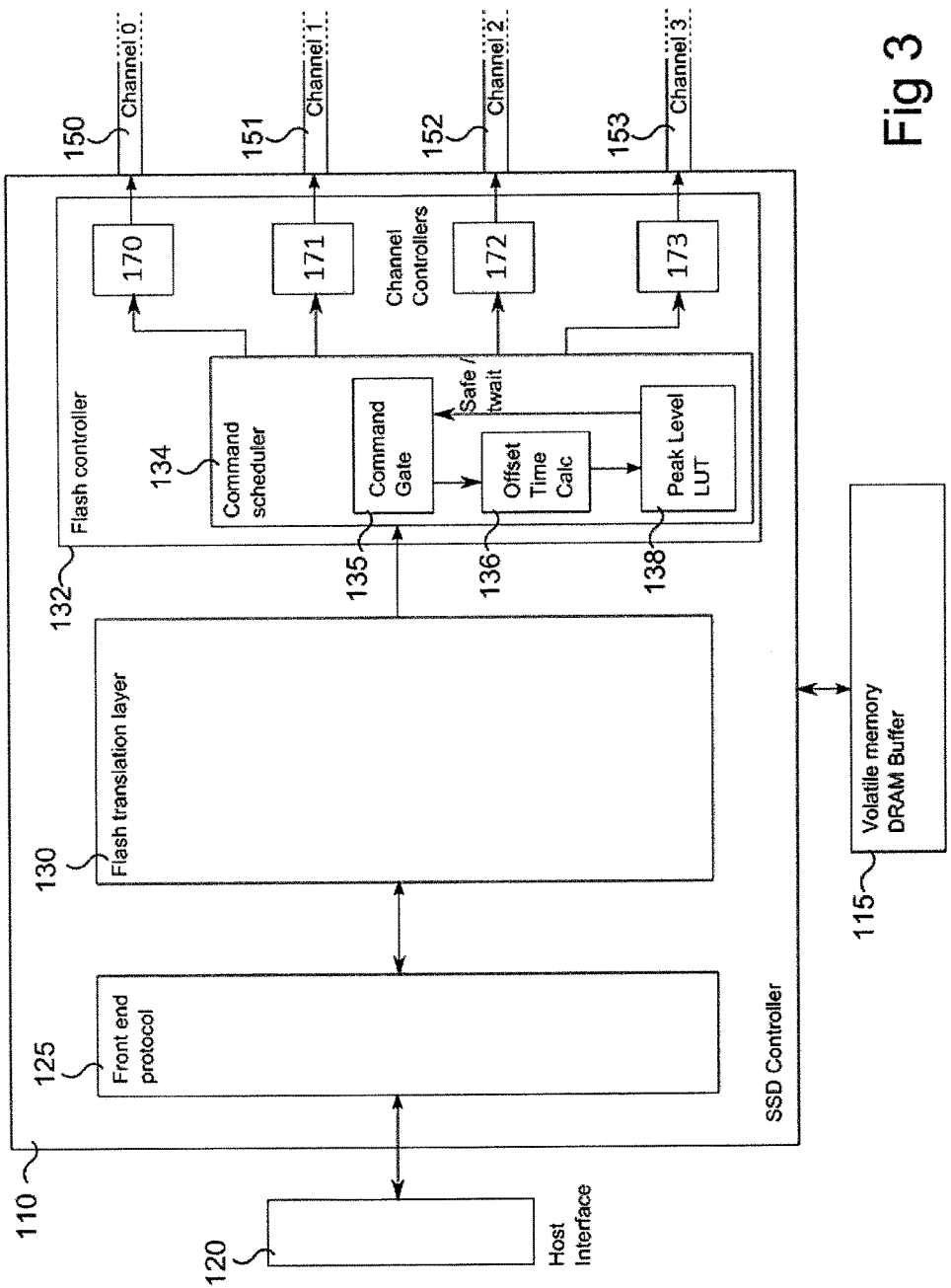
FIG. 3 is a block diagram illustrating an SSD controller in an SSD, in accordance with one embodiment of the invention

FIG. 1 illustrates a prior art structure of a basic SSD storage device 100 comprising a SSD controller 110, volatile memory buffer 115 and a non-volatile memory array 140, the SSD controller 110 communicating with a host computer system (not shown) via an interface 120. The non-volatile memory array 140 may include individual NAND flash memory devices 160a-d, 161a-d, 162a-d, 163a-d, communicating to the SSD controller 110 via memory channels 150-153. More particularly, SSD controller 110 is connected via a first bus (i.e., channel 0) to NAND flash memory devices 160a-160d. Similarly, SSD controller 110 is connected via a second bus (i.e., channel 1) to NAND flash memory devices 161a-161d, and is connected via a third bus (i.e., channel 2) to NAND flash memory devices 162a-162d, and is connected via a fourth bus (i.e., channel 3) to NAND flash memory devices 163a-163d. The SSD device 110 also connects via a separate bus to a separate memory 115, generally a volatile dynamic RAM (DRAM), which may be used as cache memory or general buffer. This memory 115 may be a separate memory device or integrated as part of the SSD controller FIG. 3 is a block diagram illustrating an SSD controller 110 in an SSD, according to one embodiment of the invention. As shown in FIG. 3, a front end protocol module 125 handles the communications with the host interface 120, a Flash Translation Layer (FTL) module 130 converts the commands received from the host to commands to be issued to the memory devices in the non-volatile memory array (not shown in FIG. 3) and the flash controller 132 manages the scheduling and sending of commands on the individual memory channels 150-153 to the memory devices of the non-volatile memory array. Within the flash controller 132, a command scheduler 134 receives commands from the FTL 130, then schedules commands to be issued to the individual memory channel controllers 140-143. To determine the timing of commands sent to the channel controllers 170-173, a command gate 135 is employed. The command gate 135 calculates an offset time 136 since the previous command was issued, which is used to index a peak current level look-up table (LUT) 138. The LUT 138 returns the corresponding indexed row which is then interpreted, or processed, as a status by the command gate 135 to determine if it is safe to issue the command to a channel controller 170-173, or, if it is unsafe, the time to wait until it does become safe to do so.

In one embodiment of the invention, a device and method for scheduling of commands sent on the channel of an SSD to the flash memory devices includes making adjustments to the scheduling of the commands to be processed on the channels because the current consumed on each channel of an SSD is dependent when the commands are initiated. Moreover, each processed command produces a current consumption profile, or Cycle, depending on the type of command processed. This is shown in FIGS. 6, 7, and 8 respectively, which illustrate the Cycles produced by Read, Program, and Erase commands.

Figure 6:
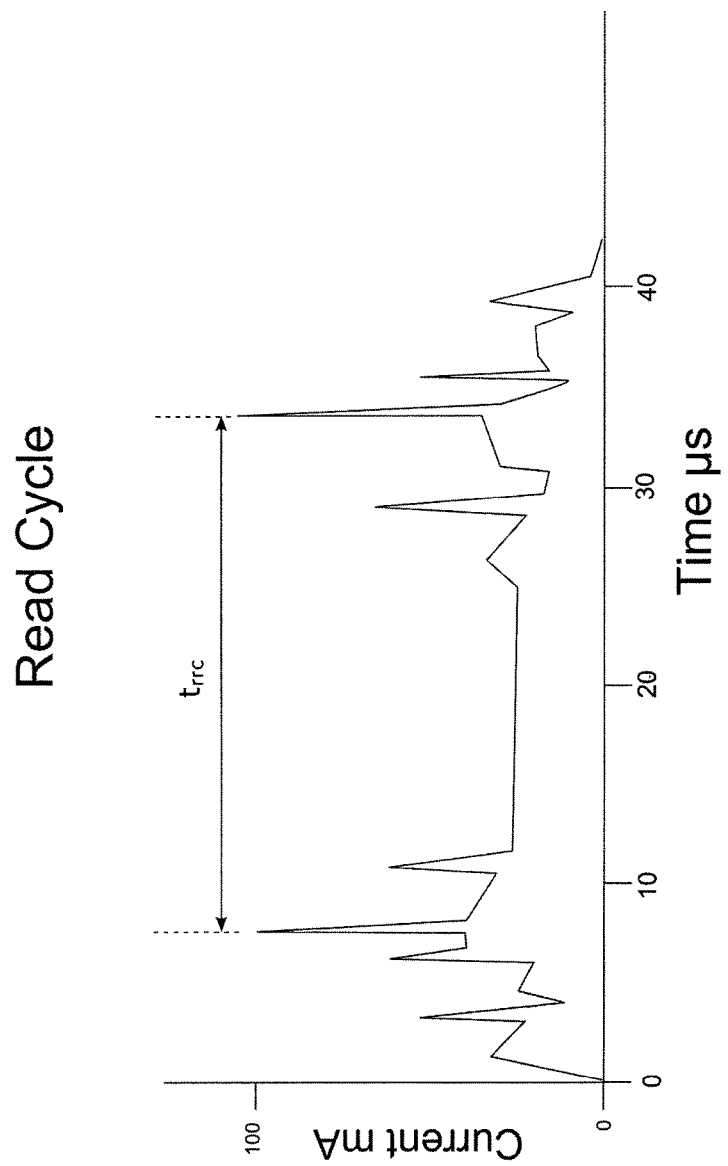
FIG. 6 is a graph illustrating the current consumption profile of a single read cycle on a NAND flash memory device of an SSD, in accordance with one embodiment of the invention.

As shown in FIG. 6, the Cycle produced by a Read command has a total duration of around 40 µs. The Read Cycle has two peaks, with a time interval of $t_{rrc}$ between the two peaks.

As shown in FIG. 7, the Cycle produced by a Program command has a total duration of around 800 µs with both major and minor peaks, repeated at frequent intervals of $t_{rpc}$, with the major peaks remaining steady through the Cycle and the minor peaks growing in intensity towards the end of the Cycle.

As shown in FIG. 8, the Cycle produced by an Erase command has a total duration of around 5 ms with distinct peaks, repeated at intervals of $t_{rec}$, with the major peaks remaining steady through the Cycle and the minor peaks growing in intensity towards the end of the Cycle.

With regards to peak current demand variations between the three commands, FIGS. 6, 7, and 8 show the current demands to be different in terms of the overall timing and repetition interval, but with peaks within the same order of magnitude. A Read Cycle peak current demand is around 100 mA, a Program Cycle peak current demand is around 120 mA, and an Erase Cycle peak current demand is around 50 mA. In addition, the actual current demand for a NAND flash memory device in an SSD may vary depending on other non-command related factors such as the core voltage, which can typically vary between 2.5 v or 3.3 v, the number of planes being used (1, 2, or 4 planes, for example), and if the lower or upper pages are being read or programmed. Nevertheless, current demands over 200 mA are easily attainable if there is coincidence between two or more peak current demands.

Figure 2:
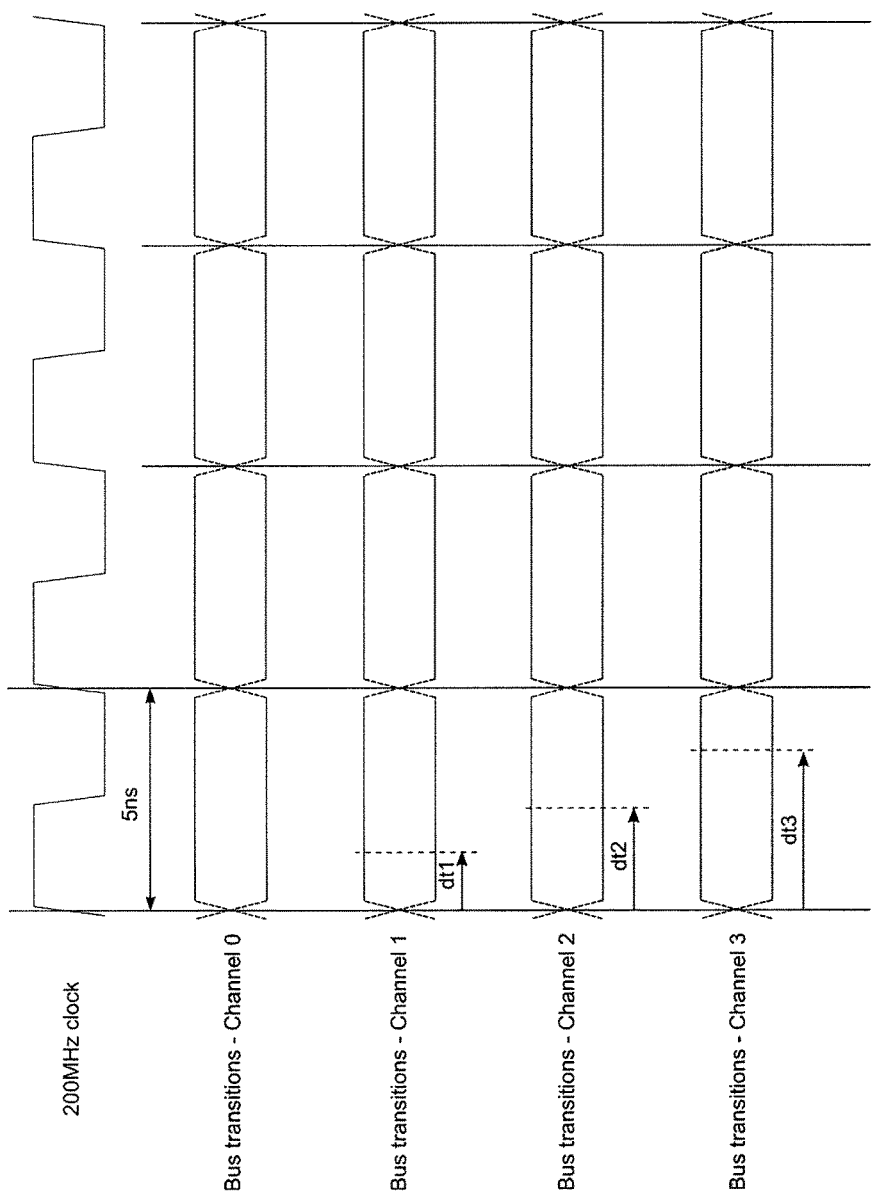
FIG. 2 is a timing diagram illustrating bus signal transition timing delays according to the prior art.
Figure 4:
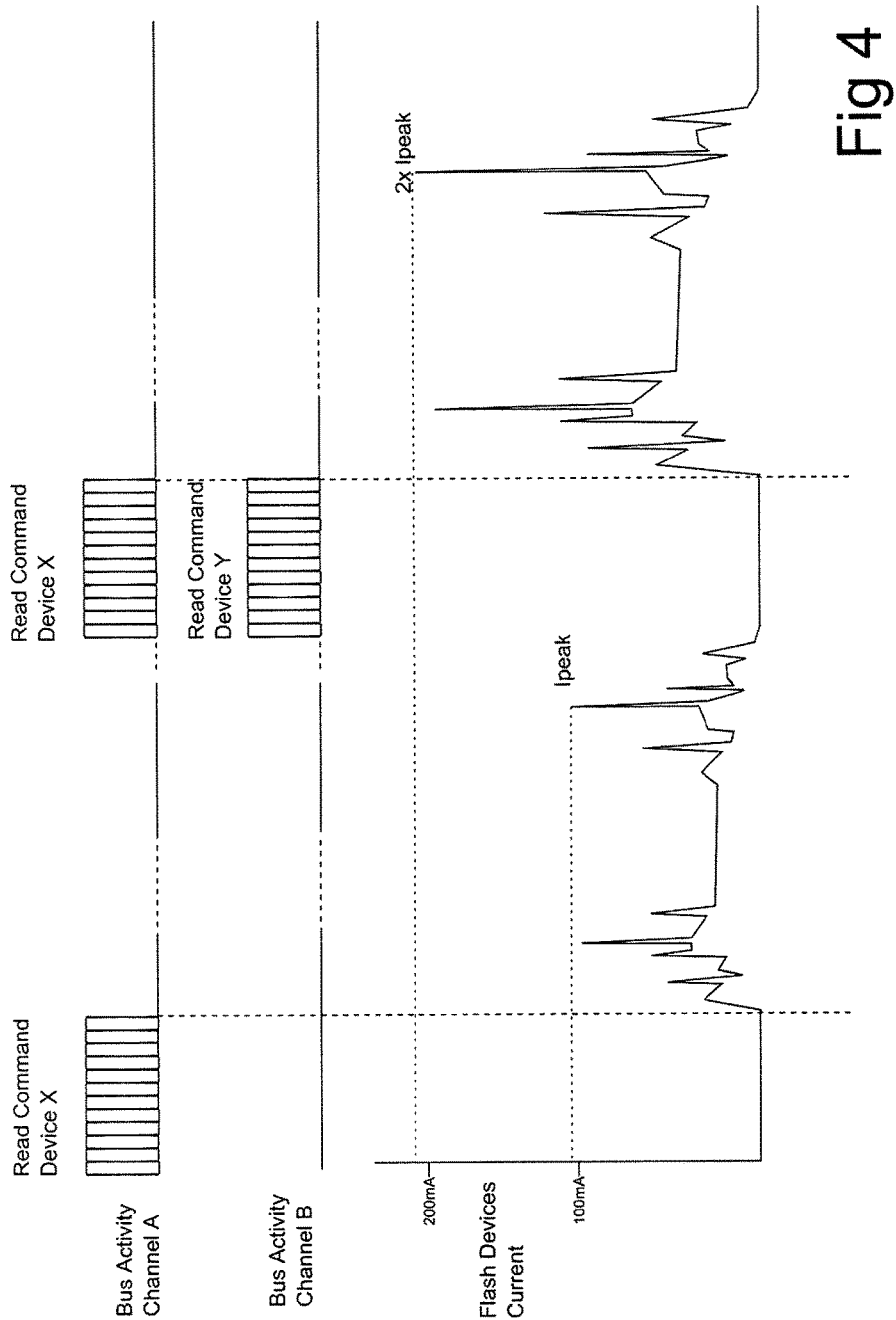
FIG. 4 is a graph illustrating individual bus activity and combined current consumption profile of two channels A and B of an SSD when a single read cycle occurs on channel A with no commands on channel B, and when two simultaneous read cycles occur on channel A and channel B, in accordance with one embodiment of the invention.
Figure 5:
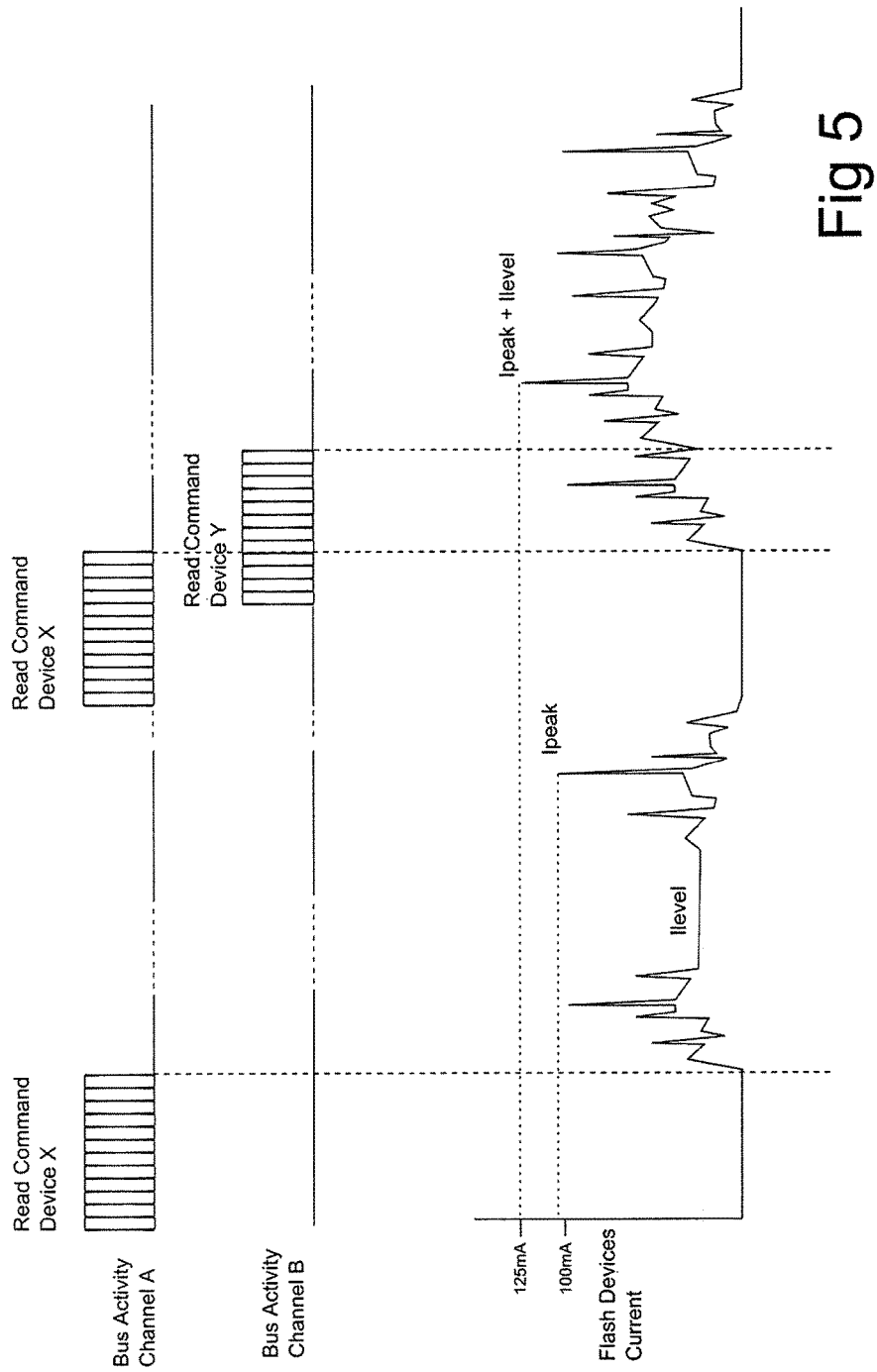
FIG. 5 is a graph illustrating the individual bus activity and the combined current consumption profile of two channels A and B of an SSD when a single read cycle occurs on channel A with no commands on channel B, and when a read cycle in channel B is initiated during a read cycle in channel A, in accordance with one embodiment of the invention.

As shown in FIG. 2, one prior art solution to eliminating the peak current demands relies on providing offset or delay to the timing of bus transitions but as shown in FIGS. 4 and 5, this method only affects the period of time of the bus transitions and does not take the Cycle of the command into consideration. As a result, this method may often have a negligible impact especially given the duration of the Cycles and the repetitive peaks that occur within a Cycle. Furthermore as the bus transitions are a fraction of the computer clock frequency the delay of the bus transition may have a de minimis impact on the order of magnitude longer Cycle times and peak durations.

The need for improvement of the shortcomings of applying a clock-based delay system is illustrated in FIGS. 4 and 5 where the current consumption profiles that will be produced by two Read Cycles are quite independent in time to the bus transition periods and, being of several orders of magnitude different in duration (μs rather than ns), are generally unaffected by small adjustments of timing to the bus transition timing.

FIG. 4 provides an example of the current consumption profiles of read commands, with a timeline showing firstly a single Read Cycle occurring on channel A, and none on channel B, and secondly, two Read Cycles occurring simultaneously, with a first read command on channel A and a second read command on channel B. As shown in FIG. 4, the maximum current peak for the single Read Cycle occurs with a value of $I_{peak}$ and the maximum current peak for the two simultaneous Read Cycle occurs with a value of $2 \times I_{peak}$, that is double the value of $I_{peak}$. It should also be noted that in the example of the single Read Cycle in FIG. 5, there is a plateau, $I_{level}$, of current consumption that occurs in between the two current peaks associated with the Read Cycle.

FIG. 5 provides an example of the current consumption profiles of a two Read Cycles when the second read command starts at the beginning of the $I_{level}$ plateau. As shown in FIG. 5 the maximum current peak for the two Read Cycles as equal to $I_{peak}+I_{level}$.

Accordingly, delaying the initiation of a read command would be preferable during the $I_{level}$ plateau of a read command currently in process and reduces the maximum current peak when both commands are run over the same time period. That being said, as shown in FIGS. 9a-9e and 10, the situation is more complex than this with maximum current peak for the two Read Cycles being processed within the same time frame being dependent on the offset time between the two read commands.

As shown in FIG. 9a, the effect on the overall current profile (the current profile being the current drawn over time) of issuing two read commands to two memory devices with zero offset time between the commands (i.e., simultaneously) is shown. Essentially, the overall current profile is the same as the current profile of a single command, but the current values are all doubled, as noted before in FIG. 4. In this example, there are two distinct peaks of current draw, Peak A of approximately 150 mA and Peak B of approximately 140 mA.

In FIG. 9b, an offset time of 40 μs is inserted between the start of one read command and the next. Here, the overall effect is of two distinct and separate current profiles as the 40 μs offset ensures that the second command's current draw only starts after the first has finished. In this case there are two Peak A events of 75 mA and two Peak B events of 70 mA. While this may be a solution to ensure that the current draw is never more than 75 mA peak (in other words, the peak of a single command on its own), it does introduce an unacceptable delay to the second command, effectively doubling the access time of a read command.

In FIG. 9c, an offset of 3 μs is inserted between the commands. In this case, Peak A is 125 mA and Peak B is 120 mA, which is an improvement over two commands issued simultaneously, but still more than the individual commands.

In FIG. 9d, an offset of 14 μs is inserted between the commands. In this case, Peak A is 95 mA and Peak B 90 mA, which is a considerable improvement over the zero offset (simultaneous case).

In FIG. 9e, an offset of 25 μs is inserted between the commands. In this case, Peak A is 145 mA and Peak B 95 mA, which indicates that inserting a longer delay (than 3 μs or 14 μs) may actually make the peak current draw almost as bad as the simultaneous case. Clearly, with a current profile having a complex waveform such as that exhibited by a read command, if a delay is shorter than the cycle time of the command (i.e., where the 2 waveforms will interact and become superposed), then care must be taken to ensure that the timing of the superposition does not result in peaks in the profile coinciding, resulting in much higher peaks of current at particular times.

Figure 10:
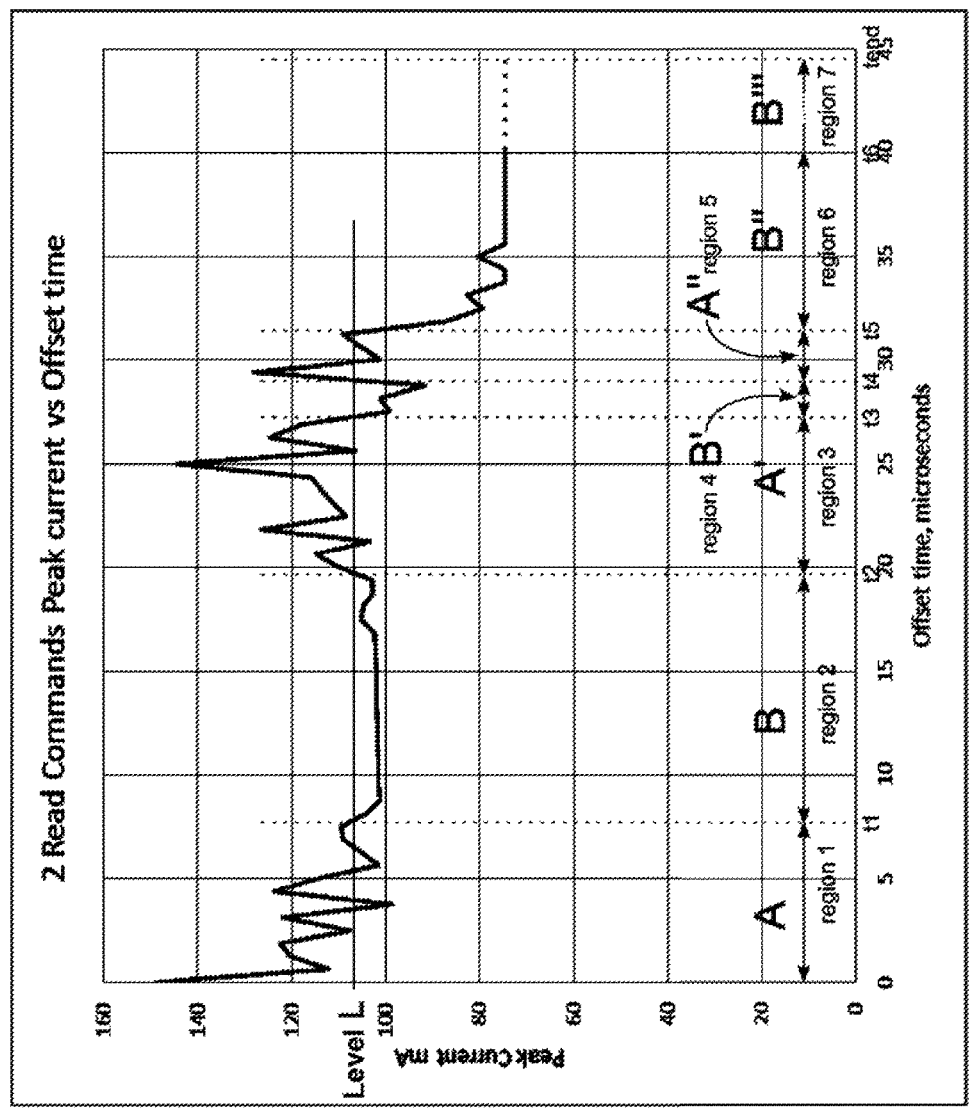
FIG. 10 is a graph illustrating the maximum peak current values associated with two read commands issued to NAND flash memory devices in an SSD with respect to an offset time between the commands, in accordance with one embodiment of the invention.

To illustrate this effect, FIG. 10 shows a graph of the maximum peak of current for two superposed read command current waveforms in the Y-axis, versus the offset time between the two commands in the X-axis. The maximum peak value varies quite considerably according to the offset time. In order to limit the peak current of two read commands being issued within less than 40 μs of each other, we can define a level L as the maximum acceptable peak current. We can then define regions of the offset time space, where if the offset time falls within the regions B, B', B" and B'" the peak current is guaranteed never to be above the level L. In the remaining regions, A, A', A", then the peak current will generally be above the level L, with occasional short excursions below the level L.

From the example in FIG. 10, the LUT in FIG. 11 can be generated over the time period of $t_0$ to $t_{end}$ where the first read command is initiated at time $t_0$ and completes all current consumption at the first read end time $t_6$ and the second command that is initiated at some time between $t_0$ and $t_6$. Regions are defined in each row with the time of the start and end ($treg_{end}$) of each region within the period time of $t_0$ to $t_6$ being defined by times $treg_{start}$ and $treg_{end}$ respectively.

In this way, we can then define the regions where the peak current is always below the level L, for example 'B' regions 2, 4 and 6 and 7, as being "safe" regions, since it will be guaranteed that if a second read command is issued with an offset from the first command within this region, the peak current of the two commands combined will always be less than the Level L at any time during the total Cycle time of the two commands combined. Therefore, if the command scheduler 134 of a flash controller wishes to issue a read command on a given channel and constrain the peak current to level L, it employs a command gate 135 which first checks the time since a first flash read command has been issued by the controller to another device on another channel, derives the offset time by subtracting this time from the current time 136 and consults a LUT 138 of the type shown in FIG. 11 where the region within which this offset time lies can be determined and returned to the command gate 135, if the offset time is within a safe 'B' type region, the second command can be issued immediately and the command gate 135 opens and issues the command. If the offset time is within an A type region, the command gate 135 waits until the elapsed offset time enters a B type region before it opens and allows the command to be issued. In the example shown, with a Level L chosen at approximately 105 mA, the longest 'A' region is approximately 8 μs, meaning that the maximum (i.e., worst case) time the second read command could be delayed by command gate 135 will be 8 µs.

However, given the approximately equal number, size and distribution of A and B regions, it is probable that, for approximately 50% of occurrences, the second read command can be issued immediately with no extra delay, given that a second command arriving at a random time will fall with equal probability into a 'B' region as an 'A' region. For the remaining 50% of occurrences, the read command will fall into an 'A' region and be delayed by 4 µs on average to reach the next 'B' region, with a delay of 8 µs being the worst case. Overall, successive read commands may only be delayed by about 2 µs on average, but with the benefit that peak currents can be limited to less than 105 mA, compared to peaks of 150 mA that could occur if successive read commands were issued with no attention paid to the time any preceding commands were issued.

In implementing a look-up table as a decision making device, the SSD controller performs the following routine for every command to be processed according to the following steps as shown in the flowchart in FIG. 12. In step 200 the scheduler receives a request to send a read command and sends to a command gate. The command gate timestamps the read command, $T_{present}$ 210, then retrieves the previous read command timestamp $T_{previous}$ 220 and calculates difference $T_{present}-T_{previous}$ 230, being the offset time between the two commands. The command gate uses the offset time to index into a peak current level LUT which returns the region the offset time occupies (type, 'A' or 'B', and region end time $treg_{end}$) in step 240. In doing so, the command gate is determining whether it is safe to issue the command and not exceed the peak current level used to calculate the LUT. A decision is made by the command gate depending on the region type 250, where if the region type is 'B', the command gate opens and issues the read command immediately 260; if the region type is 'A', in step 270 the command gate waits for $treg_{end}-(T_{present}-T_{previous})$ until it opens and issues the read command (in other words waits until the offset time reaches the end of the region 'A' and enters a safe region 'B' before it opens). Finally in step 280 the scheduler proceeds to process the next command received.

In one embodiment, after the LUT returns the region type and $treg_{end}$ in step 240, the process could loop back to step 220 to perform the same analysis (e.g., steps 230 and 240) on the second, third, fourth, etc., to last command that had been previously issued and review the look-up associated with these earlier commands and repeat or cycle through steps 220 to 240 to ensure that the start or initiation of the command is also in a safe 'B' region with regards to the earlier commands.

In one embodiment, step 240 may incorporate a plurality of LUTs representing different command pair sequences other than the FIG. 11 look-up table based on two sequential read commands. In this embodiment, step 240 would also include a sub-step of selecting the appropriate look-up table according to the command pair sequence in question.

In one embodiment, between steps 230 and 240, if a determination is made that $T_{present}-T_{previous}$ is greater than the end times of all earlier commands steps 240-270 may be eliminated since the determination confirms that the channels in question have no active commands in mid-cycle.

FIG. 13 illustrates a case where two LUTs are employed. LUT1 is used for the command pair consisting of the current command being processed and the previous command that was processed. LUT2 is used for the command pair consisting of the current command being processed and the command one before the previous command that was processed. For clarity, the LUT data is represented by a timeline showing the region type versus offset time, though in practice the LUT itself would be a table of data with rows, each row having the region type ('A' or 'B') and the start and end offset time of the region.

The time difference, or offset, between the current and previous command is $t_{off1}$ 310. When this time offset is used to index the LUT1 300, a row with region having type 'A' is returned, which means that the command gate will wait until the end of the region, at time $treg1_{end}$ 310, before issuing the command.

Before the command is issued, the second LUT2 330 is consulted, to check that the peak current consumption of the current command in combination with the command before the previous command will also be limited to the chosen current limit, by ensuring that the time difference between the current command and the command before the previous command will also fall in a region 'B' of LUT2 (or will be delayed to the end of the region, if it falls within a region 'A'). In this example, the time difference between the previous command and the command before the previous command is $c_{off1}$ 340. The time difference between the current command and the command before the previous command is therefore set to $t_{off2}=c_{off1}+treg1_{end}$ 350 and LUT2 indexed with this time difference. The result is a row with type 'B', which indicates the current command can be issued immediately with respect to the command before the previous command.

Hence, the command can be send immediately at this time difference point 320 and the peak current will be guaranteed to be within the limit set for both the previous command and the command before the previous command.

FIG. 14 illustrates a different case, where the time difference, or offset, between the current and previous command is $t_{off3}$ 360. When this time offset is used to index the LUT1 300, a row with region having type 'B' is returned, which means that the command gate may issue the command immediately.

Before the command is issued, the second LUT2 330 is again consulted, however in this case the offset time $t_{off3}$ falls 380 into a Region 'A' of LUT2 330, which corresponds to an offset $t_{off4}=c_{off1}+t_{off3}$ indexing LUT2 330. Therefore, the command to be issued will be held until the command gate opens at the end of the Region 'A' at offset $treg3_{end}$ 390. This corresponds to a command initiate offset of $t_{processoff}=treg3_{end}-c_{off1}$ 395 in LUT1, which lies within a Region 'B', so that the command may be issued directly at this time offset, $t_{processoff}$ 395.

FIGS. 13 and 14 illustrate how the scheduling of a command may be gated by both the LUT of the command in combination with the previous command, LUT1, and also the LUT of the command in combination with the command before the previous command, LUT2. Only when both LUTs have a common time offset where a region 'B' is shown may the command be issued.

In one embodiment, the LUT may be generated in advance by taking readings of a flash memory device's current consumption over the duration of the command cycles it performs, then calculating the combined currents of one command followed by another with a time difference between the two commands. The maximum peak current value of this combination can be evaluated. Then, a series of calculations can be made of the combined currents with varying time difference and the series of maximum peak current value plotted as in FIG. 10. From this, the maximum current level may be decided and used to obtain the region A and B start and end times and the LUT so generated from this data. Difference LUTs may be generated for different maximum current levels and for different command type combinations.

In one embodiment, all the LUT data so generated may be stored in any non-transitory storage medium, such as ROM or non-volatile flash memory (including the non-volatile memory array 140 of the SSD itself) and moved by the processor of the SSD controller into fast access memory such as the DRAM buffer 115 or on-chip SRAM of the SSD controller for fast access by the command scheduler 134 and flash controller 132.

In one embodiment, the LUTs generated may also be updated in real time by taking measurements of current consumed by the flash memory devices as the SSD ages, or by having adjustment values based on the age (which may be the total elapsed time since first power up or the total elapsed time that the flash memory devices have been in a powered up state) of the flash memory devices, the ambient temperature or the number of program-erase cycles the devices have endured, which may be applied to the LUTs to take into account variations and changes in the current profiles of the flash memory devices due to age, temperature and number of program-erase cycles.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A solid-state storage device comprising:
   a processor;
   an I/O interface configured to allow communication between the processor and a host computer system, wherein the processor is configured to receive an instruction from the host computer system via the I/O interface;
   a controller unit connected to the processor, the controller unit further connected to one or more memory bus channels, wherein each memory bus channel is connected to one or more flash memory devices, the controller unit configured to initiate a processing of a command issued by the processor to a flash memory device in response to the processor receiving the instruction from the host device, the controller unit further configured to assign a timestamp to the command; and
   a non-transitory storage memory connected to the controller unit, the storage memory storing a look-up table having one or more rows containing time regions when the command can be processed, each time region have a type identifier and a start time and an end time,
   wherein the controller unit is further configured to evaluate a time difference between a timestamp of a command to be initiated and processed and a timestamp of a command previously initiated and being processed, and to retrieve the row of the look-up table indexed by the time difference, and if the time difference is found within any time region of a row of the look-up table having a type identifier of a first type, immediately initiating the processing of the command, and if the time difference is found within any time region of a row of the look-up table having a type identifier of a second type, initiating processing of the command at the end time of the time region with the second type identifier.

2. The solid-state storage device of claim 1, wherein the storage memory stores a plurality of look-up tables.

3. The solid-state storage device of claim 2, wherein the controller is configured to select a look-up table from the plurality of look-up tables based upon a type of the command to be initiated for processing and a type of the command previously initiated and being processed, or a maximum allowed peak current value.

4. The solid-state storage device of claim 2, wherein the controller is configured to index at least two look-up tables using the evaluated time difference.

5. The solid-state storage device of claim 4, wherein the controller is configured to use a time the first look-up table permits initiation of the processing as the time to be used to index the second look-up table.

6. The solid-state storage device of claim 1, wherein the look-up table is constructed such that the type identifier of the time regions are of the first type if a peak current consumed by the one or more flash memory devices by processing the command to be initiated and the command previously initiated is below a maximum allowed peak current value, and of the second type if the peak current consumed by the one or more flash memory devices by processing the command to be initiated and the command previously initiated will be above the maximum allowed peak current value.

7. The solid-state storage device of claim 1, wherein the look-up table is updated in real-time with adjustment values based on real time measurements of a current consumed by the one or more flash memory devices according to a type of command issued to the flash memory devices.

8. The solid-state storage device of claim 1, wherein the look-up table is updated in real-time with adjustment values based on an ambient temperature.

9. The solid-state storage device of claim 1, wherein the look-up table is updated in real-time with adjustment values based on an age of the flash memory devices.

10. The solid-state storage device of claim 1, wherein the look-up table is updated in real-time with adjustment values based on a number of program and erase cycles performed by the flash memory devices.

11. A method for scheduling the processing of commands on a solid-state drive comprising:
    assigning a timestamp to a command to be processed on the solid state drive,
    calculating a time difference between the timestamp of the command to be processed and a timestamp of a command previously processed;
    indexing a look-up table using the time difference where the look-up table contains one or more rows containing time regions when the command to be processed can be processed, each time region having a type identifier and a start time and an end time;
    initiating processing of the command to be processed immediately if the time difference is found to be within a time region having a type identifier of a first type; and
    initiating processing of the command to be processed at the end time of a time region if the time difference is found to be within the time region having a type identifier of the second type.

12. The method in claim 11, further comprising indexing a plurality of look-up tables.

13. The method in claim 12, further comprising selecting a look-up table from the plurality of look-up tables, the selection based upon a type of command to be processed and a type of command previously processed, or a maximum allowed peak current value.

14. The method in claim 12, further comprising indexing a second look-up table using a time a first look-up table permits initiating processing of the command.

15. The method in claim 11, wherein the time regions of the look-up table have the type identifier of the first type if a peak current consumed by one or more flash memory devices processing the command to be processed and the command previously processed is below a maximum allowed peak current value, and having the second type if the peak current consumed by the flash memory devices by processing the command to be processed and the command previously processed is above the maximum allowed peak current value.

16. The method in claim 15, further comprising updating the look-up table in real-time with adjustment values based on real-time measurements of the current consumed by the flash memory devices according to a type of command issued to the flash memory devices.

17. The method in claim 15, further comprising updating the look-up table in real-time with adjustment values based on an ambient temperature.

18. The method in claim 15, further comprising updating the look-up table in real-time with adjustment values based on an age of the flash memory devices.

19. The method in claim 15, further comprising updating the look-up table in real-time with adjustment values based on a number of program and erase cycles performed by the flash memory devices.

20. The solid-state storage device of claim 1, wherein the command to be initiated and processed and the command previously initiated and being processed are of different command types.

21. The method of claim 11, wherein the command to be processed and the command previously processed are of different command types.

* * * * *